United States Patent [19]

Hebert, Jr. et al.

[11] 4,343,686

[45] Aug. 10, 1982

[54] METHOD FOR CONTROLLING ETCHING OF ELECTROLYTIC CAPACITOR FOIL

[75] Inventors: John R. Hebert, Jr., North Adams; Joseph H. Silveira, Cheshire; Robert W. Herzig, North Adams, all of Mass.

[73] Assignee: Sprague Electric Company, North Adams, Mass.

[21] Appl. No.: 239,093

[22] Filed: Feb. 27, 1981

[51] Int. Cl.³ .................... C25F 3/02; H01L 21/306; B44C 1/22

[52] U.S. Cl. ............... 204/129.2; 204/129.25; 204/211; 156/627; 156/665

[58] Field of Search ............... 204/129.2, 129.25, 211; 156/626–627, 665

[56] References Cited

U.S. PATENT DOCUMENTS

| | | | |
|---|---|---|---|
| 2,809,346 | 10/1957 | Archer | 324/40 |
| 2,853,445 | 9/1958 | Catotti et al. | 204/129.4 |
| 2,930,741 | 3/1960 | Burger et al. | 204/129.4 |
| 3,085,950 | 4/1963 | Thomas et al. | 204/129.43 |
| 3,553,052 | 1/1971 | Jubb, Jr. | 156/626 X |
| 3,645,876 | 2/1972 | Wilson | 204/28 X |
| 3,764,897 | 10/1973 | Greenwood | 324/40 |
| 3,962,048 | 6/1976 | Gilbert et al. | 204/211 X |
| 3,988,215 | 10/1976 | Scherr | 204/211 X |
| 4,126,510 | 11/1978 | Moscony et al. | 156/626 |

FOREIGN PATENT DOCUMENTS

| | | | |
|---|---|---|---|
| 38-4664 | 4/1963 | Japan | 204/211 |
| 45-9993 | 4/1970 | Japan | 204/211 |

Primary Examiner—Donald R. Valentine
Attorney, Agent, or Firm—Connolly and Hutz

[57] ABSTRACT

In a process for etching aluminum foil to increase its actual surface area to apparent surface area for use as an electrode in an electrolytic capacitor, a wire coil is placed adjacent the foil as it exits the etch station. The coil is energized to produce eddy currents in the foil. The voltage induced by theses eddy currents is sensed at the same coil or another coil. The foil drawing speed through the etch station is altered in response to that sensed voltage, or another process parameter is changed, to maintain at a constant value the ratio of the actual to apparent foil surface area.

12 Claims, 6 Drawing Figures

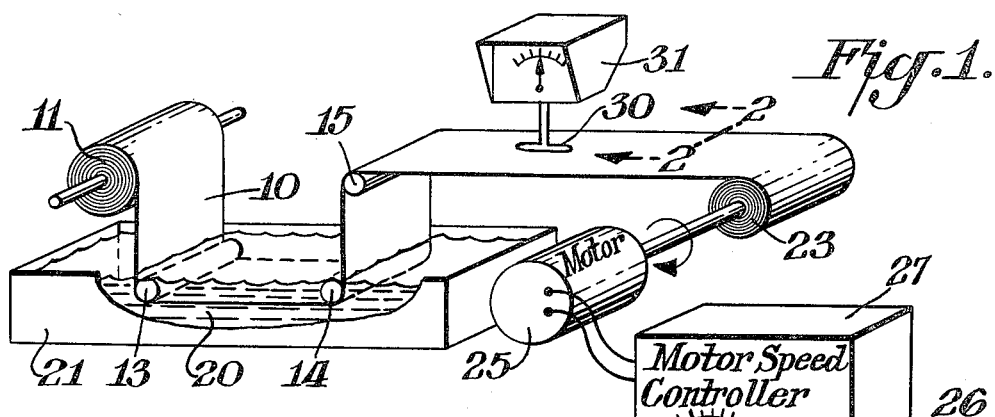
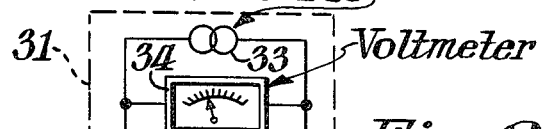
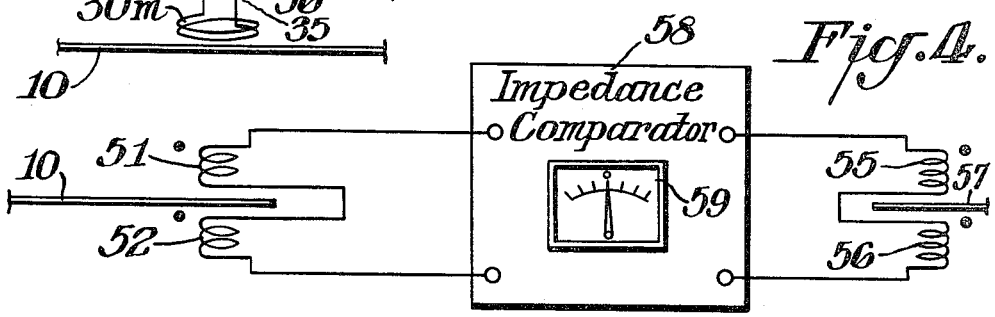
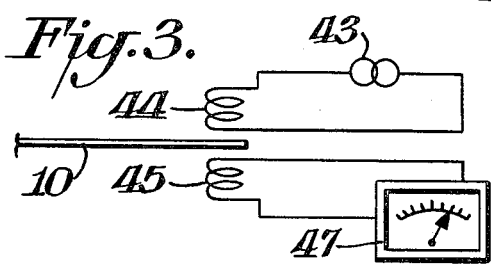
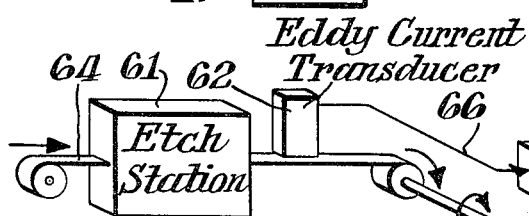
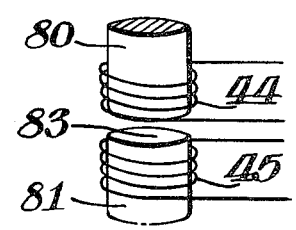

METHOD FOR CONTROLLING ETCHING OF ELECTROLYTIC CAPACITOR FOIL

BACKGROUND OF THE INVENTION

The present invention relates to electrolytic capacitors of the kind including a formed valve-metal foil anode spaced from a cathode and a liquid electrolyte therebetween, and more particularly relates to a controlled method for etching the valve metal foil anode prior to forming to increase the actual valve-metal surface area and thus increase the capacity of the capacitor.

It is well known that etching anode and cathode valve-metal foils increases the actual surface area to be "formed". The "forming" process results in a valve-metal oxide film being formed over all exposed surface portions of the foil including the etch pits, cavities, pores or whatever irregularities that were caused by the etching. Since the capacitance is directly proportional to the area of the anode surface, it is desirable to achieve at etching a high ratio of actual area to apparent area. The term "apparent area" as used herein is the planar area of the etched foil that is equal to the area existing before etching. Such ratios are referred to as etch ratios or gain and may range in value from 10 to 50. For a particular foil having an etch gain of 10, equal sized test squares of the unetched and the etched material both formed by the same process will exhibit capacitances, respectively, in the ratio of 1:10. Lower etch ratios are generally preferred for heavily formed high voltage anode foil, while high gain foil is used in capacitors having low voltage ratings.

It is also desired to control the etching process so as to produce etched foil having a constant predetermined ratio of actual to apparent areas. Toward this end, in a continuous etch process, it is customary to periodically cut out a sample of the freshly etched foil, form it to a predetermined voltage and measure the characteristic capacity of the formed sample in an electrolytic cell. This means of controlling the etch process is not only slow but is also complex, subject to error and is costly in material and in terms of manpower requirements. Such etched foil normally varies about ±10% from a nominal gain, and at least 10% more foil is employed in each capacitor than would be necessary if the foil had an invarient gain.

The great variety of etch processes that have been used for one special type capacitor or another include DC and AC electrochemical methods as well as pure chemical etch methods. Each of those etch methods tends to produce its own characteristic material removal pattern. Foil thickness as determined by use of a mechanical micrometer, may not change at all during most etch processes. For some etch processes, the amount of material removal, as determined by weight loss measurements, tends to be a rather linear function of the ratio of actual to apparent surface areas. But for others, this relationship is quite non-linear. In any case, the use of weight loss measurements to control etched surface area is like the capacity measurement itself not suitable for use as a fast response continuous measure of etched foil surface area.

It is an object of the present invention to provide a method for continuously monitoring the etch ratio and altering at least one etch process parameter to maintain a nearly constant etch ratio.

It is a further object of the present invention to provide substantially etch-ratio-invarient-foil to permit the manufacture of less costly and smaller electrolytic foil capacitors.

SUMMARY OF THE INVENTION

In a method for controlling the degree of etching of an electrolytic capacitor foil, the foil is drawn through an etch station and near the point of exit of the foil therefrom, an alternating magnetic field is generated to produce eddy currents in the foil. An electrical signal is produced which has an amplitude that is a function of the strength of the eddy currents. At least one etch process parameter is adjusted in such a direction that tends to maintain the signal amplitude at a constant predetermined value. This has the effect of controlling the ratio of the actual to the apparent foil areas to within narrow limits.

The electrical capacity per unit area that can be developed in an etched capacitor foil is very much dependent upon the etch process parameters, of etch time or rate of foil drawing, chemical composition of the etchant and in an electro-etching process the voltage applied. Other etch process parameters are also determinative of the degree of foil etch, such as temperature of the etchant and the waveform of the voltage applied in electro-etching. Any such foil-gain-affecting etch process parameter is subject to automatic variation for maintaining etch ratio constant in accordance with the eddy current detection and feed back control method of this invention.

BRIEF DESCRIPTION OF THE DRAWING

FIG. 1 shows a continuous etch machine with a metering device for continuously indicating the etched surface area of the foil, which device is used in the first preferred embodiment of this invention.

FIG. 2 shows schematically the metering device of FIG. 1, an associated coil and the etched foil shown in end view section 2—2.

FIG. 3 shows another configuration of components for monitoring etch surface ratio including two coils, an AC current source and a volt meter.

FIG. 4 shows yet another configuration of components for monitoring etch surface ratio.

FIG. 5 shows a diagram of an automatically controlled foil-etch machine employing the method of this invention.

DESCRIPTION OF THE PREFERRED EMBODIMENTS

Figure 6:
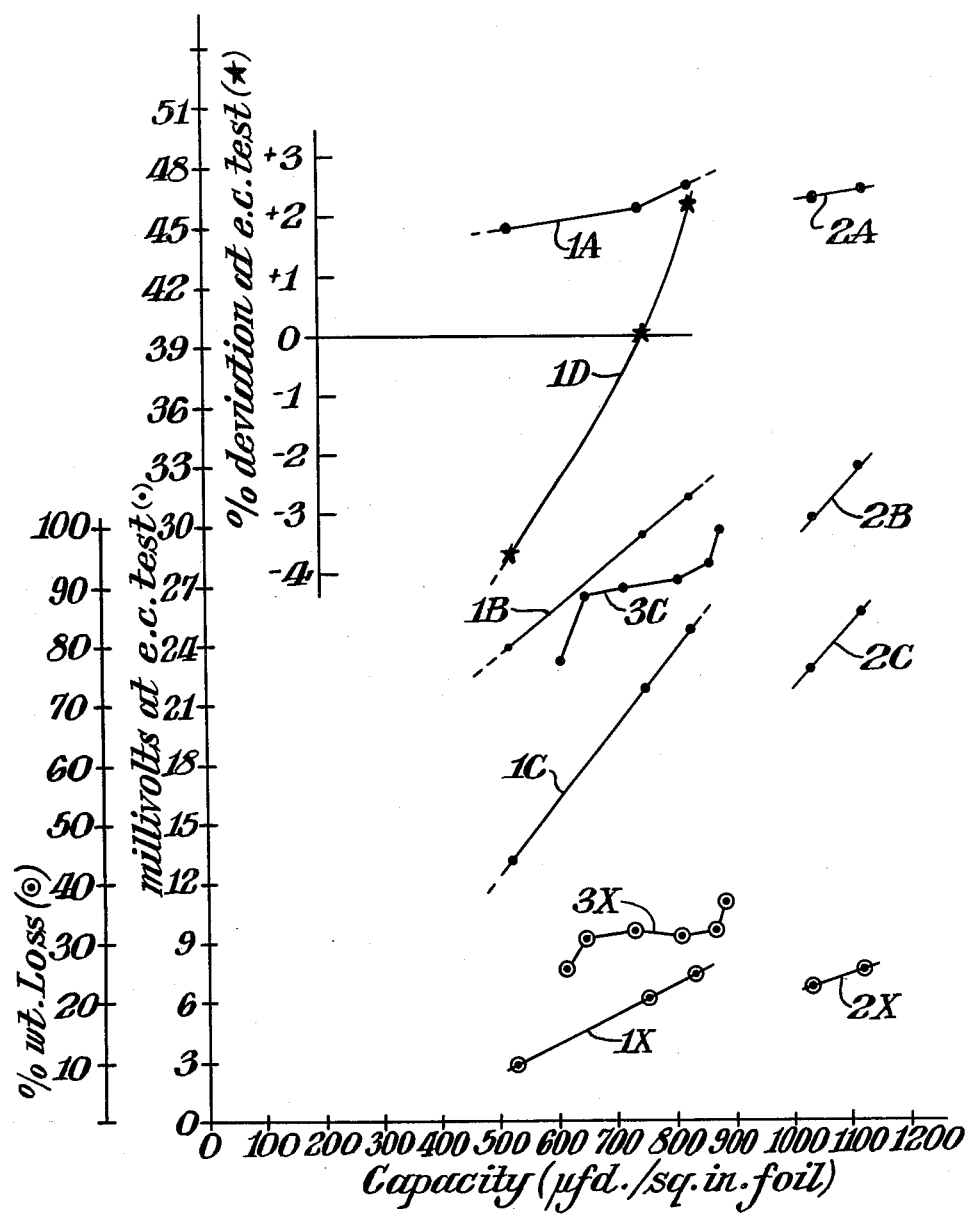
FIG. 6 shows plots of the percent weight loss at etching as well as the eddy current test responses as a function of the wet check capacity for variously etched aluminum capacitor foil.

In FIG. 1 an aluminum foil 10 is drawn from supply roll 11, over idler rollers 13, 14 and 15. The portion of the foil 10 that is between rollers 13 and 14 is submersed in a liquid chemical etchant 20 contained in tank 21. The foil 10 is drawn onto a takeup roll 23 that is driven by electric motor 25. The motor 25 is energized from power lines 26 via a motor speed controller 27 that may be a conventional variable auto-transformer manually varied by knob 29. Alternatively controller 27 may be an electronic controller that is electrically varied by a low power electrical signal as will be illustrated.

A loop of wire 30 is connected to the input of the impedance meter 31. The loop 30 serves as an open field inductor adjacent the foil 10 near the point of foil exit from the etch station. Loop 30 may be replaced by a multiturn inductor 30m as is diagrammatically indicated in FIG. 2, but preferably has a high diameter to height ratio as is essentially inherent in the single turn loop 30.

The meter 31 consists of an AC current source 33 in parallel with an AC voltmeter 34 that is connected, in turn, across the coil terminals 35 and 36. The AC current source 33 establishes an AC current in the coil 30m that being placed adjacent the foil 10 induces eddy currents therein that reduce the magnetic field and accordingly reduce the inductance of the coil 30m. The etch pits, holes and interstices impede the flow of the eddy currents by causing them to take a more circuitous path in the metal. The eddy currents generate $I^2R$ losses in the foil and this effect is reflected in the coil impedance as a resistive component. This resistive component is also a function of the configuration of surface irregularities in the etched foil 10. Thus the foil eddy currents influence the impedance of coil 30m and the voltmeter 34 responds to changes in etch induced irregularities in the foil 10.

An alternative system for generating eddy currents in foil 10 and detecting differences in the preceding etching, is shown in FIG. 3. A current source 43 establishes a current in a coil 44 located adjacent one side of the foil 10 and a volt meter 47 is connected across a second coil 45 that is located adjacent the foil 10 but on the opposite side from coil 44. In this case, the voltmeter indication is least for the least etching and becomes greater as the etched surface of foil 10 becomes more extensive. The reverse or dual test system would consist of applying a voltage to the coil and sensing the current.

FIG. 4 shows yet another scheme whereby two coils 51 and 52 are connected series-aiding and with the foil 10 sandwiched in a gap between them. Another and substantially identical pair of coils 55 and 56 have sandwiched in the gap between them a sample piece of etched foil 57 having the desired ratio of actual etched surface area to apparent area. These two pairs of coils are each connected to a pair of input terminals of an impedance comparator 58 having a voltmeter 59 that responds to the difference in impedances between the pairs of coils.

With reference to FIG. 5, an etch station 61, an eddy current type transducer 62 and a motor 63 each have corresponding elements in FIG. 1. The foil 64, being etched, is drawn by motor 63 from left to right, as shown. The electrical signal at line 66 is a function of the actual to the apparent surface area of the foil after etching. For example, if the transducer system shown in FIG. 4 is employed as transducer 62, then the output voltage of the comparator 58, that is proportional to the voltage which actuates the comparator meter 59, is the signal appearing on line 66 in FIG. 5.

Motor controller 68 may be any one of the many commercially available controllers. The controller 68 receives power from a power main, line 70, and delivers power via a controlled power line 71 to a motor 63. The controlled power is proportional to the difference between the etch ratio of the foil 64 being etched and the reference etched-foil (57 in FIG. 4). The tendency toward hunting of this feedback system will be minimized by placing the transducer coil as close to the point of exit from the etch station as possible. It may be desirable to insert the transducer coil(s) in the etchant at some intermediate point in the etch station to obtain a faster response to the etch rate, when the conductivity of the etchant is orders of magnitude less than that of the foil metal, as is usually the case. In any case, a proportional plus integral plus derivative type controller, or the like, will preferably be included in the controller as is well known in the machine control art for maintaining stability in feedback systems, i.e. for preventing hunting or overshooting.

A first eddy current test station, corresponding to that of FIG. 2, was constructed and used for experimental measurements of variously etched foils as will be described. The current source 33 was a Model 200CD oscillator made by Hewlett Packard Co., Palo Alto, California set at 100 KHz in series with a 1000 ohm resistor. A Hewlett Packard voltmeter Model 400E was used as meter 34. A current probe (not shown) consisting of a wire loop about the conductor leading to coil terminal 35 was connected to another model 400E voltmeter (not shown) to monitor the current in test coil 30m. This current was maintained at a constant value by manually adjusting the output amplitude of the generator. The voltage indication of the first mentioned voltmeter (34) is thus proportional to the impedance of test coil 30m.

A second eddy current test station, corresponding to that of FIG. 3, was constructed. The assembly of the two coils 44 and 45 is illustrated in FIG. 7. Two insulative cylindrical mandrels 80 and 81 having a diameter of 0.5 inch (1.3 cm) are mounted coaxially with a ⅛" (0.32 cm) gap 83 between them. This compares with a typical aluminum capacitor foil of 2 mils (0.005 cm). Each of coils 44 and 45 consists of 50 turns of varnish insulated magnet wire of gauge AWG #30. The width of each coil, 44 or 45, was 3/16 inch (0.48 cm), seen here in a vertical direction. The current source was constructed just as was the source 33 of FIG. 2. The model 400E voltmeter was used as meter 47.

A third eddy current test station, corresponding to that of FIG. 4 employs two coaxial coil pairs 51/52 and 55/56 each identical to the pair 44/45 of FIG. 7. The impedance comparator 58 is a Model 1654 made by GenRad, Inc., Concord, Massachusetts, that was operated at a frequency of 100 KHz.

Three groups of capacitor foils were prepared. A first group (1) was etched in a sulphuric acid electrolyte (not electrified). For each of three subgroups, the experimental foils were exposed for 100%, 105% and 110% of a standard etch time, respectively. Each experimental foil was weighed before and after etching to determine percent weight loss at etching and was measured after etching in each of the three eddy current test stations described above. After an oxide was grown over the surfaces of each etched foil, a standard wet check test of capacity per unit foil area was performed.

The results of these measurements are provided in the graph of FIG. 6. Curves 1A, 1B and 1C present data obtained from measurements made in the above described eddy current test stations that correspond to those illustrated in FIGS. 2, 3 and 4, respectively. Curve 1X is the weight loss data. The first group of foils were also measured in the third test station, corresponding to FIG. 4, except one of the foils having 750 μfd/sq.in. was placed in the reference coil gap. This data is shown by curve 1D.

A second group (2) of experimental foils were etched by the same process as that of group 1 foils except that different concentrations of chlorine ions were included in the electrolyte. Weight loss at etching was determined and the eddy current measures of etched foils surface area was taken as for group 1 foils. The curve 2X, represents weight loss data. Curves 2A, 2B and 2C are eddy current test data taken in the test stations corresponding to those of FIGS. 2, 3 and 4, respectively.

Thus, the eight curves 1 and 2 illustrate the change in foil surface area and weight loss as a function of two etch process parameters in a chemical etch method. Here it is seen that an increase in chlorine ion concentration and/or increased exposure to an etch electrolyte of fixed formulation will increase etch efficacy and actual surface area or gain (as determined by the capacity measurement). Thus for this particular process, the capacity per unit foil area that will result at formation is predictable by either a weight loss measurement or by an eddy current measurement.

A third group (3) of experimental foils were etched by an AC electrochemical process. After a determination of weight loss, the foils were formed. Using the above described test station designated C, and placing an unetched sample of the foil in the reference coil-gap, the percent deviation as indicated by the impedance comparator was noted for each AC etched foil. A wet check determination of capacitance per square inch was then made. The weight loss curve 3X, and eddy current curve 3C test data are plotted versus capacitance per square inch in FIG. 6. In this case the eddy current test provides a better indication of capacity than does weight loss.

The oxide grown on the surfaces of the AC etched foil samples was accomplished by an electro forming step in an electrolyte at 30 volts. The oxide on all the other foil samples was passively formed in air at 25° C. for 24 hours prior to the capacity measurements.

The sample etched foils of the first and second groups were originally 2.03 mils (0.00516 cm) thick aluminum while those of the third group began as 3 mils thick aluminum. No substantial change in foil thickness resulted from the etching. For example for an air-formed unetched foil providing 25 microfarads/sq.in. and for the foils air-formed after etching (groups 1 and 2) providing capacitors of 524, 754, 836, 1035 and 1132 in microfarads/sq.in., the thicknesses as determined by micrometer measurements were 2.03, 1.97, 1.95, 1.92, 1.95 and 1.95 mils, respectively. Clearly these thicknesses are of no use in predicting capacitance or etched surface area and further do not correlate with the eddy current test data. On the other hand the eddy current test data correlates well with the ultimate foil capacity, as well if not better than does etch weight loss data. However, eddy current test data is available on a continuous basis and capable of being applied in an automatic etch control system whereas weight loss data is not.

What is claimed is:

1. A method for controlling in a foil etching process the ratio of the actual etched surface area to the apparent surface area of a valve metal foil that is intended for use in an electrolytic capacitor, comprising:
   drawing said foil through an etch station and etching said foil therein by a process having at least one process parameter that affects said actual etched surface area;
   generating an alternating magnetic field to produce eddy currents in said foil near the point of exit of said foil from said etching station;
   producing an electrical signal having an amplitude that is a function of the magnitude of said eddy currents; and
   adjusting said at least one process parameter in a direction that tends to maintain said signal amplitude at a constant predetermined value to control the ratio of said actual etched area to said apparent area.

2. The method of claim 1 wherein said generating is accomplished by placing one wire coil adjacent said foil near said point of exit, and energizing said one coil from an alternating current energy source.

3. The method of claim 2 wherein said producing is accomplished whereby said electrical signal is made proportional to the electrical impedance of said one coil.

4. The method of claim 2 wherein said energizing is accomplished by applying a constant amplitude AC voltage across said one coil and the resulting alternating current therethrough is said electrical signal.

5. The method of claim 2 whereby said energizing is accomplished by applying a constant amplitude alternating current through said one coil and the resulting AC voltage across said one coil is said electrical signal.

6. The method of claim 2 wherein said producing is accomplished by placing another wire coil near said foil but opposite said one coil, the AC voltage appearing across said another coil being said electrical signal.

7. The method of claim 2 wherein said one coil is comprised of two coaxial essentially identical subcoils connected in series with a gap between them, said foil near said point of exit passing through said gap.

8. The method of claim 1 wherein said adjusting of said at least one parameter comprises adjusting the speed of said drawing through said etch station.

9. The method of claim 1 wherein said etching process includes contacting said foil in said etch station with a chemical etchant and wherein said adjusting of said at least one parameter comprises adjusting the strength of said etchant.

10. The method of claim 1 wherein said etching process includes submersing said foil in a liquid electrolyte and applying a voltage between said foil and said electrolyte, said adjusting of at least one parameter comprising adjusting said voltage.

11. A method for controlling in a foil etching process the ratio of the actual etched surface area to the apparent surface area of a valve metal foil that is intended for use in electrolytic capacitor, comprising:
   drawing said foil through an etch station and etching said foil therein by a process having at least one process parameter that affects said actual etched surface area;
   electrically exciting a test coil that is adjacent said etched foil near the point of exit from said etching station to generate eddy currents in said etched foil producing an electrical signal having an amplitude that is a fixed function of the magnitude of said eddy currents;
   comparing said signal with a predetermined signal representing the desired actual surface area of said etched foil; and
   adjusting said at least one parameter, according to the result of said comparing step, in a direction that tends to reduce the difference between said compared signals to control the ratio of said actual to said apparent surface areas.

12. The method of claim 11 wherein said comparing is accomplished by electrically exciting a reference coil that is essentially identical to said test coil, placing a sample etched valve-metal foil having the desired ratio of actual to apparent surface area adjacent to said reference coil, said predetermined signal being said fixed functions of the eddy currents generated in said sample foil by said excited reference coil.

* * * * *